(12) United States Patent
Kim et al.

(10) Patent No.: US 9,297,417 B2
(45) Date of Patent: Mar. 29, 2016

(54) METHOD OF MANUFACTURING COMPOSITE MATERIAL BEARING COMPONENT

(71) Applicant: AGENCY FOR DEFENSE DEVELOPMENT, Daejeon (KR)

(72) Inventors: Yunchul Kim, Daejeon (KR); Hongsuk Cha, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 305 days.

(21) Appl. No.: 14/010,062

(22) Filed: Aug. 26, 2013

(65) Prior Publication Data
US 2015/0000138 A1     Jan. 1, 2015

(30) Foreign Application Priority Data

Jun. 27, 2013 (KR) .................. 10-2013-0074444

(51) Int. Cl.
*F16C 33/20* (2006.01)
*F16C 33/28* (2006.01)

(52) U.S. Cl.
CPC ............ *F16C 33/201* (2013.01); *F16C 33/206* (2013.01); *F16C 33/208* (2013.01); *F16C 33/28* (2013.01); *Y10T 29/49707* (2015.01)

(58) Field of Classification Search
CPC ............ F16C 2326/43; F16C 2223/32; F16C 2202/50; F16C 33/64; F16C 33/6996; F16C 2208/32; F16C 2208/02; F16C 2208/04; F16C 33/201; F16C 33/28; F16C 33/208; F16C 33/206; Y10T 29/49707; Y10T 29/49689; Y10T 29/49702; Y10T 29/4971
See application file for complete search history.

(56) References Cited

U.S. PATENT DOCUMENTS

| 2,539,329 | A | * | 1/1951 | Sanders | B05D 7/20 138/DIG. 3 |
| 5,373,637 | A | * | 12/1994 | Harris | B23P 15/003 29/458 |
| 5,407,508 | A | * | 4/1995 | Harris | B29C 33/485 156/169 |
| 6,264,369 | B1 | * | 7/2001 | Mesing | F01D 17/162 384/300 |
| 8,231,276 | B2 | * | 7/2012 | Than Trong | F16C 33/201 29/898.041 |
| 8,308,368 | B2 | * | 11/2012 | Blair | F16C 13/006 29/898.066 |
| 8,727,622 | B2 | * | 5/2014 | Kurata | F16C 33/203 384/13 |
| 2012/0219353 | A1 | * | 8/2012 | Schaffhaeuser | F16C 11/0638 403/135 |

(Continued)

FOREIGN PATENT DOCUMENTS

| JP | 2005-337381 A | 12/2005 |
| KR | 10-2005-0081493 A | 8/2005 |
| KR | 10-2007-0032858 A | 3/2007 |

*Primary Examiner* — Jason L Vaughan
(74) *Attorney, Agent, or Firm* — LRK Patent Law Firm

(57) ABSTRACT

A method of manufacturing a composite material bearing component includes designing a pattern of a fabric combination including a PTFE film, a quartz fabric and a glass fabric, which are stacked, in consideration of a final shape of a bearing, and stacking the fabric combination on a fusion surface which is a steel surface of a bearing structure of a composite material bearing; and simultaneously performing molding and fusing under conditions of a thermal treatment temperature of 300~400° C. and a pressure of 30~100 kgf/cm², thereby manufacturing the composite material bearing. This composite material bearing functions as a self-lubricating high performance bearing, thus satisfying high performance requirements of the driving friction surface of a B&S (Ball & Socket) nozzle which is a thrust vector control nozzle and satisfying a high load and low friction efficient required of guided weapon components.

7 Claims, 7 Drawing Sheets

(56) References Cited

U.S. PATENT DOCUMENTS

2012/0294557 A1* 11/2012 Soelch ................ C09D 147/00 384/282

2015/0219156 A1* 8/2015 Okubo .................. F16C 33/206 442/237

* cited by examiner

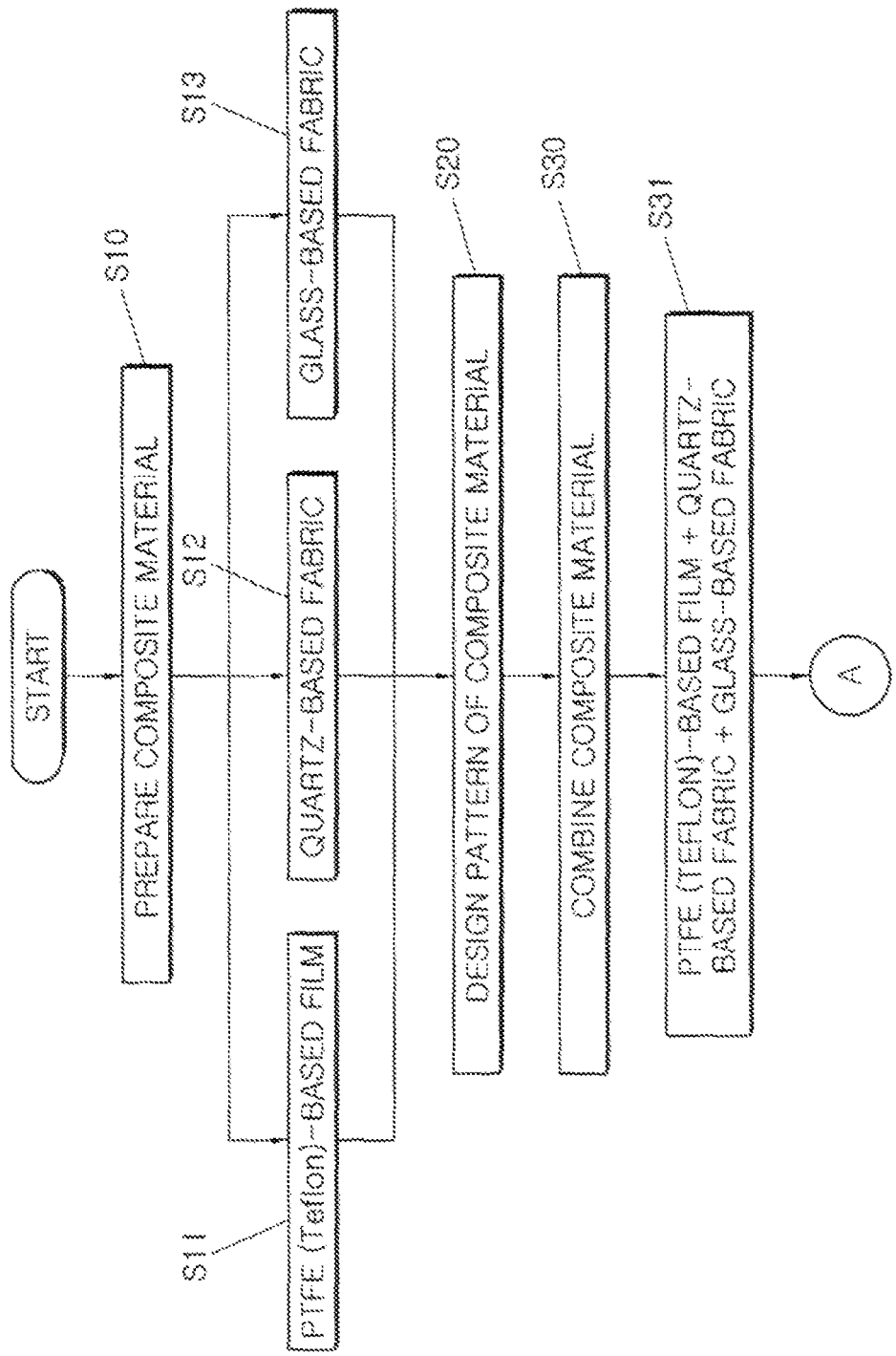

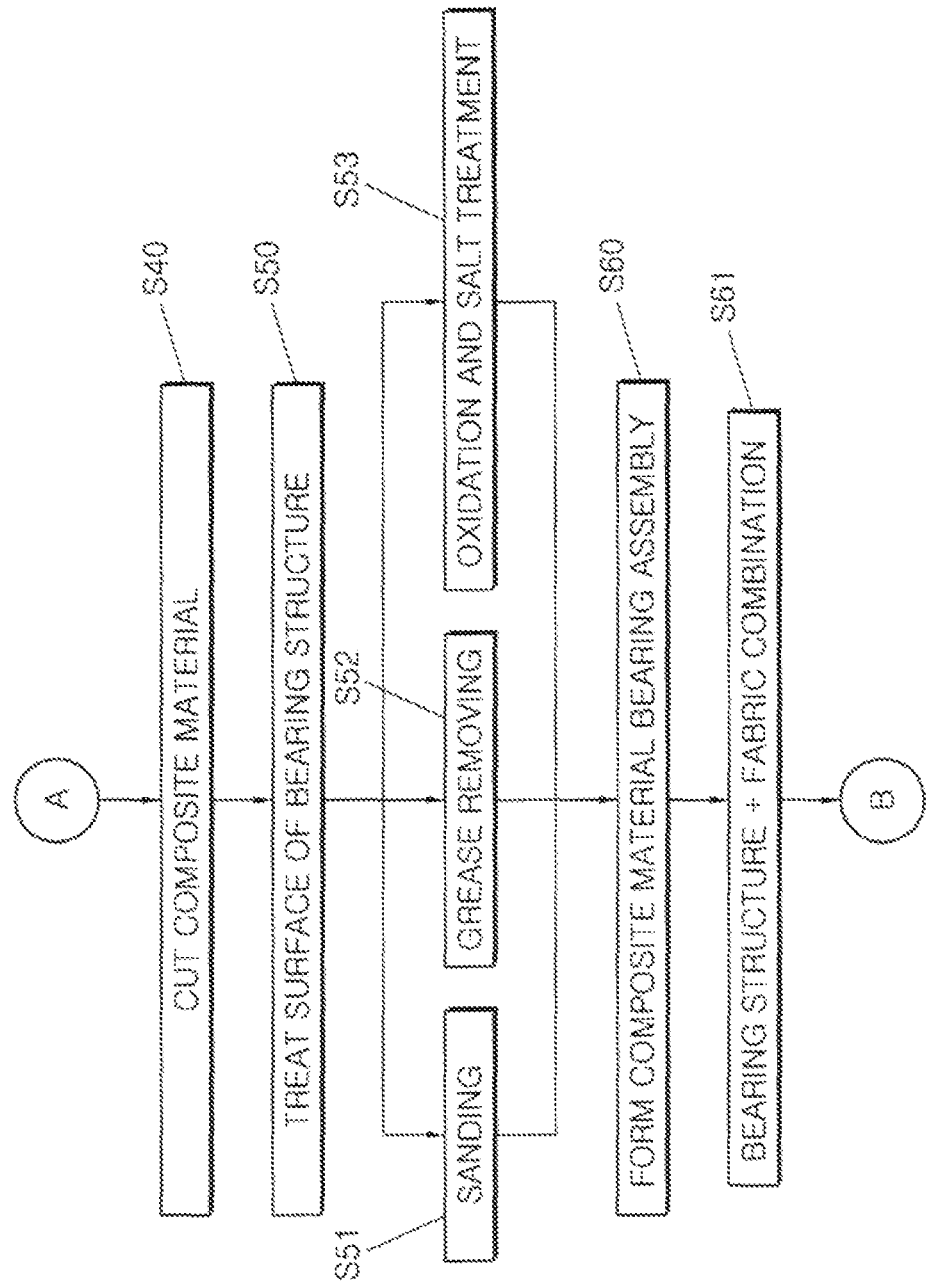

Example

Comparative Example

METHOD OF MANUFACTURING COMPOSITE MATERIAL BEARING COMPONENT

CROSS REFERENCE TO RELATED APPLICATION

This application claims the benefit of Korean Patent Application No. KR 10-2013-0074444, filed Jun. 27, 2013, which is hereby incorporated by reference in its entirety into this application.

BACKGROUND OF THE INVENTION

1. Technical Field

The present invention relates to a self-lubricating high performance bearing, and more particularly, to a method of manufacturing a high performance bearing component from a composite material comprising a PTFE (Poly Tetra Fluoro Ethylene) resin and quartz/glass fabrics.

2. Description of the Related Art

Generally, a thrust vector control nozzle includes a B&S (Ball & Socket) nozzle, and the B&S nozzle includes a self-lubricating bearing able to decrease a driving friction force rising a thin layer of a PTFE resin.

Typically, a surface layer made exclusively of a PTFE resin creates stress contamination on the surface due to sudden loads, and may cause the friction coefficient to increase because of friction surface damage.

Such stress concentration and friction coefficient increase may be alleviated by mixing the PTFE resin with a fabric, and the mixture thus obtained is referred to as a composite material.

However, as the B&S nozzle of the thrust vector control nozzle includes a moving part having a spherical ball shape and a fixing part supported spherically, the discharge pressure of combustion gas acts as stress on a socket region, and such stress generates a driving friction force. Hence, the composite material of the self-lubricating bearing should be made of a fabric having superior structural performance and a PTFE resin having high friction performance.

Particularly, when the fabric material includes a carbonaceous material, a glass-based material or an inorganic material, the composite material may achieve a friction surface having sufficient strength and high rigidity.

For example, a self-lubricating bearing using the composite material comprising a fabric material such as a carbonaceous material, glass-based material or an inorganic material and a PEFE resin having high friction performance may operate under high load conditions. Particularly in the case where the bearing is subjected to sudden operation loads when the center of rotation thereof deviates from an original position, the bearing may endure the loads without the fracture of materials due to contact loads and may satisfy operating conditions while resisting malfunction due to deviation of the center of rotation.

Thus, the self-lubricating high performance bearing using the composite material having such performance becomes suitable for use is a B&S nozzle which generates a driving friction force due to the discharge pressure of combustion gas as in a thrust vector control nozzle.

SUMMARY OF THE INVENTION

Accordingly, the present invention has been made keeping in mind the above problems encountered in the related art, and an object of the present invention is to provide a method of manufacturing a composite material bearing component for use in a self-lubricating high performance bearing, which includes fusing a composite material obtained by integrally molding a PTFE resin with quartz/glass fabrics to a bearing structure.

In order to accomplish the above object, the present invention provides a method of manufacturing a composite material bearing, comprising combining a Teflon-based film, a quartz-based fabric and a glass-based fabric depending on an appropriate number and stacking sequence, thus forming a fabric combination; cutting the fabric combination; treating a fusion surface of a bearing structure on which the fabric combination is stacked; stacking the fabric combination on the fusion surface of the bearing structure, thus forming a composite material bearing assembly; coupling the composite material bearing assembly with a jig; mounting the composite material bearing assembly with the jig into a chamber; insulating the chamber; after sintering the composite material bearing assembly mounted in the chamber by heating and pressing.

The fabric combination may comprise the Teflon-based film, the quartz-based fabric and the glass-based fabric, or may further comprise a glass/Teflon-based film.

The quartz-based fabric and the glass-based fabric are impregnated with the Teflon-based film, and sintered.

The fabric combination may be cut into a fan-shape, and the fusion surface of the bearing structure may be subjected to sanding, grease removing, oxidation and salt treatment.

The jig may have a spherical surface corresponding to the composite material bearing assembly and may be fixed to the composite material bearing assembly by pressing.

The composite material bearing assembly positioned in the chamber may be insulated in such a manner that an outer surface thereof is covered with an organic or inorganic fabric.

The sintering temperature by heating of the chamber may be 300~400° C., and the sintering pressure by pressing of the chamber may be 30~100 kgf/cm$^2$.

BRIEF DESCRIPTION OF THE DRAWINGS

The above and other objects, features and advantages of the present invention will be more clearly understood from the following detailed description taken in conjunction with the accompanying drawings. In which;

FIG. 1A, FIG. 1B and FIG. 1C illustrate a flowchart of a process of manufacturing a composite material bearing component according to the present invention;

DESCRIPTION OF THE PREFERRED EMBODIMENTS

Hereinafter, a detailed description will be given of embodiments of the present invention, with reference to the appended drawings, and such embodiments may be variously modified by those skilled in the art, and are not construed as limiting the present invention.

Figure 1C:
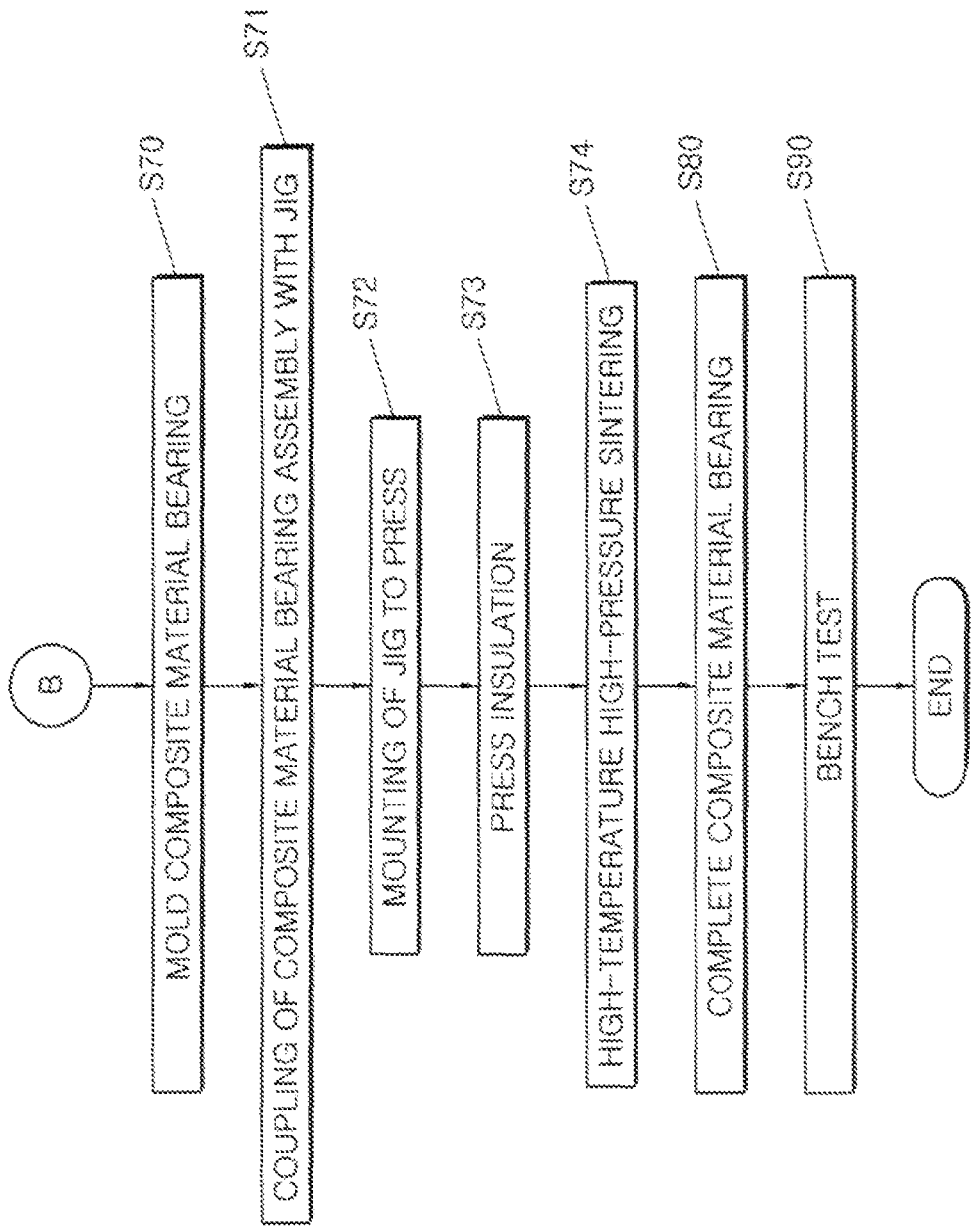

FIG. 1A, FIG. 1B and FIG. 1C illustrate a flowchart of a process of manufacturing a composite material bearing component according to the present invention.

A composite material prepared in S10 includes a PEFE (Teflon)-based film S11, a quartz-based fabric S12 and a glass-based fabric S13. A composite material bearing is manufactured using these materials, thereby ensuring a bearing pressure of 40 kg/mm² or more and a friction coefficient of 0.02 or less.

S20 is a step of designing a pattern of the composite material. Such a pattern is designed in consideration of a final shape of a composite material bearing formed with a bearing structure.

For example, the pattern of the composite material is designed into a fan shape.

S30 is a step of combining the composite material. This step is achieved by sequentially stacking the PTFE (Teflon)-based film, the quartz-based fabric and the glass-based fabric, which constitute the composite material.

For example, a layer structure is formed in such a manner that the quartz-based fabric is stacked on the PTFE (Teflon)-based film, and the glass-based fabric is then stacked on the quartz-based fabric. The PTFE (Teflon)-based film has a thickness of 0.1~0.2 mm, the glass-based fabric has a thickness of 0.1~0.2 mm, and the quartz-based fabric has a thickness of 0.3~0.4 mm. In particular, the numbers of PTFE (Teflon)-based films, glass-based fabrics and quartz-based fabrics are determined taking into consideration bearing pressure and layer thickness.

S40 is a step of cutting the composite material. Through such cutting, a fan-shaped fabric combination having the PTFE (Teflon)-based film, the quartz-based fabric and the glass-based fabric, which are sequentially stacked, is prepared.

The fabric combination may comprise the Teflon-based film, the quartz-based fabric, the glass-based fabric and a glass/Teflon-based film, or may comprise the glass/Teflon-based film.

S50 is a step of performing surface treatment of the bearing structure. Such surface treatment includes sanding S51, grease removing S52, and oxidation and salt treatment S53.

Upon sanding, smoothness of the surface of the bearing structure in contact with the fabric combination is enhanced, and upon grease removing, grease of the surface of the bearing structure in contact with the fabric combination is removed. Upon oxidation and salt treatment the extent of fusion of the surface of the bearing structure in contact with the fabric combination may increase.

The bearing structure is made of a steel material, but different materials may be used, as necessary.

S60 is a step of forming a composite material bearing assembly. The composite material bearing assembly is formed by stacking the fabric combination on the fusion surface of the bearing structure as in S61.

Figure 2:
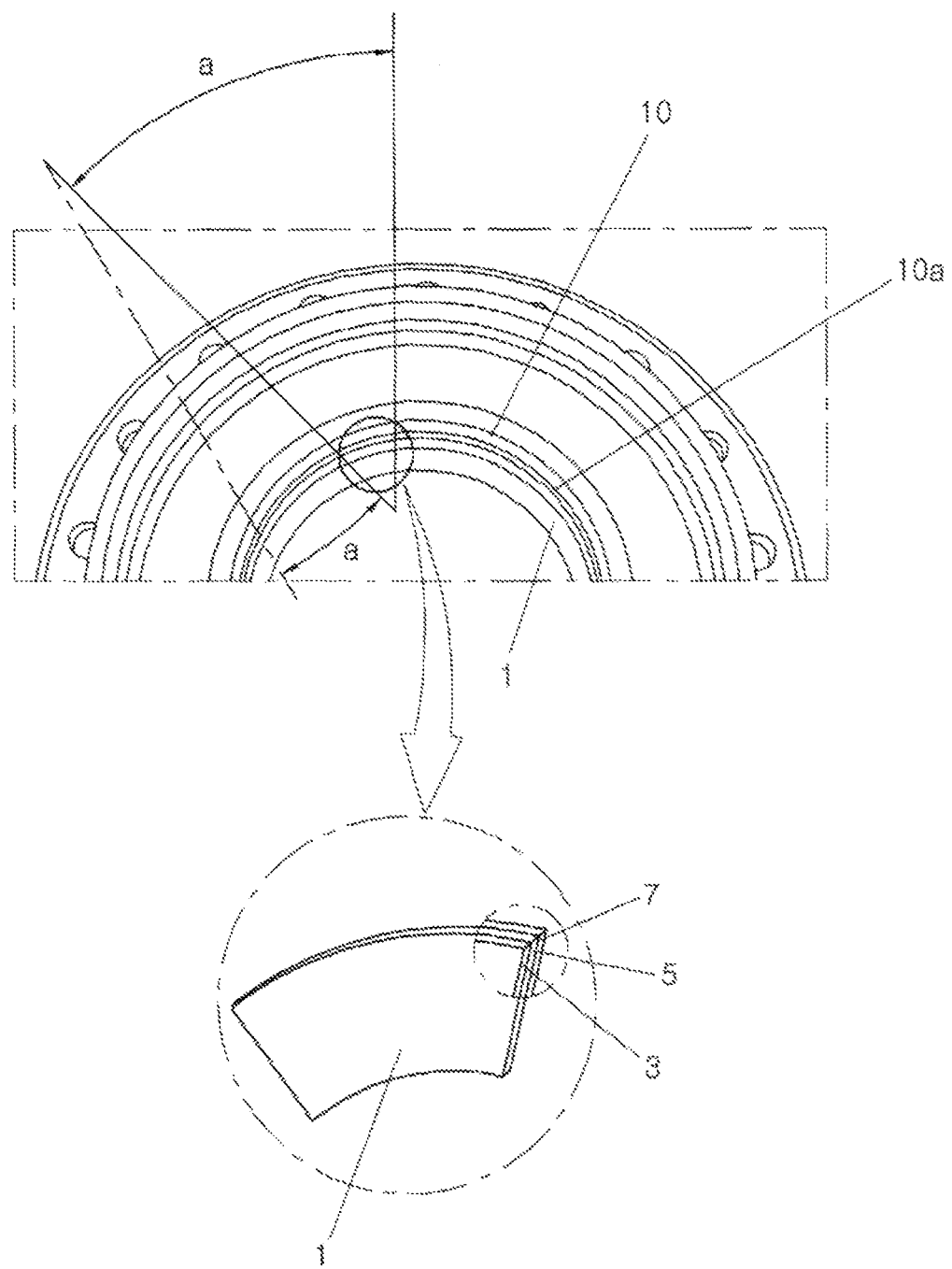
FIG. 2 illustrates a composite material bearing assembly formed by combining the composite material according to the present invention and a bearing structure.

FIG. 2 illustrates the fabric combination 1 and the bearing structure 10.

As illustrated in the drawing, the fabric combination 1 is positioned on the fusion surface 10a of the bearing structure 10 which constitutes the composite material bearing, and the fan shape of the fabric combination 1 is attained by dividing the entire region by predetermined intervals a. Furthermore, the layer structure of the fabric combination 1 includes a PTFE (Teflon)-based film 3, a quartz-based, fabric 5 and a glass-based fabric 7, which are sequentially disposed. Typically, the PTFE (Teflon)-based film 3 forms a friction surface which comes into direct contact with a target to which the composite material bearing is joined.

Also, the bearing structure 10 is directly coupled with the target to which the composite material bearing is joined and is directly fused with the fabric combination 1.

S70 is a step of molding the composite material bearing, which includes jig coupling S71, press mounting S72, insulation treatment S73, and sintering S74.

As the composite material bearing assembly is moved and transported together with the jig in S71, the subsequent press mounting process may be more easily performed. As suck the jig has a spherical surface corresponding to the composite material bearing assembly and is fused by pressing.

Upon pressing in S72, the composite material bearing assembly is mounted together with the jig into a press chamber, thereby entering preparation for molding.

Insulation in S73 closes the space of the press chamber having the composite material bearing assembly placed therein, thus further increasing controllability for beating and pressing conditions. In particular, the thermal treatment temperature may be accurately controlled.

Sintering in S74 increases the internal temperature and pressure of the press chamber, so that the fabric combination is fused to the fusion surface of the bearing structure, thereby forming a composite material bearing assembly comprising the bearing structure and the fabric combination which are integrated with each other. As such, the thermal treatment temperature is 300~400° C., the pressure is 30~100 kgf/cm², and the sintering time is 3 hr.

Moreover, the outer surface of the bearing structure or the composite material bearing assembly may be subjected to insulation treatment using a carbonaceous or inorganic fabric, and the thermal treatment temperature may be controlled more accurately via such insulation treatment.

Figure 3:
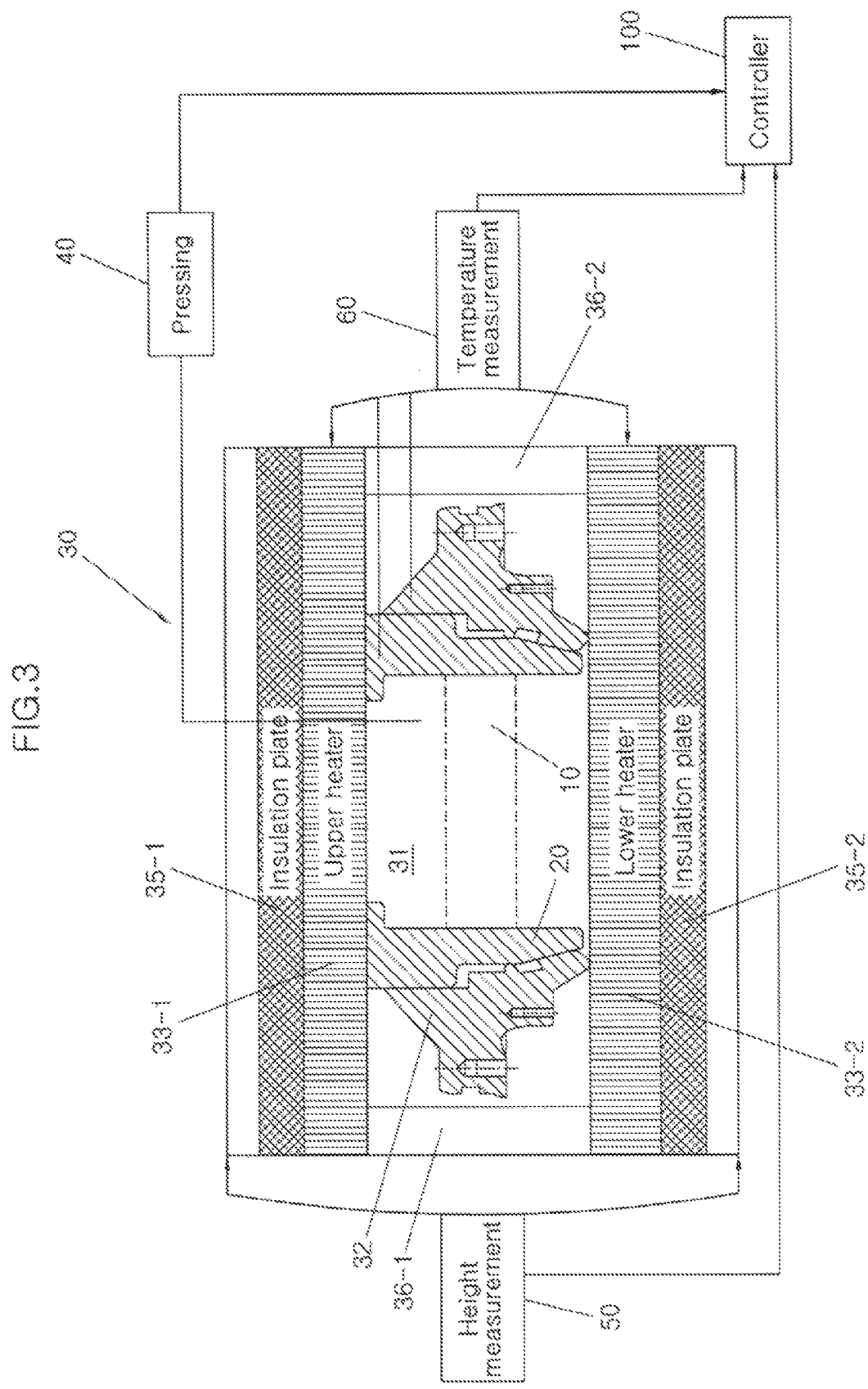
FIG. 3 illustrates the composite material bearing assembly according to the present invention, which is mounted to a press so as to be molded.

FIG. 3 illustrates a press 30 for molding the composite material bearing.

As illustrated in the drawing, a jig 20 for fixing the composite material bearing assembly is coupled with the clamp 32 of the press 30 and is thus positioned in the press chamber 31 of the press 30.

The press 30 further includes a molding unit for integrating the bearing structure with the fabric combination, and the molding unit includes heaters 33-1, 33-2 for increasing the internal temperature of the press chamber 31, an insulation member for sealing the inner space of the press chamber 31 to prevent temperature loss, and a pressurizer 40 for increasing the internal-pressure of the press chamber 31.

The heaters 33-1, 33-2 include an upper heater 33-1 disposed on the press chamber 31, and a lower heater 33-2 disposed under the press chamber 31, so that the inner space of the press chamber 31 may be uniformly heated by means of the upper heater 33-1 and the lower heater 33-2.

The insulation member includes an upper heater insulation member 35-1 and a lower heater insulation member 35-2 place on the upper heater 33-1 and the lower heater 33-2, respectively, and a left chamber insulation member 36-1 and a right chamber insulation member 36-2 which seal the left side and the right side, respectively, of the press chamber 31.

Also, the press 30 further includes a detection unit for precisely controlling the molding process for integrating the bearing structure with the fabric combination, and the detection unit includes a height sensor 50 for measuring the adjusting the height of the press chamber 31 so as to be adjusted depending on the size of the bearing structure 10 coupled with the jig 20, and a temperature sensor 60 for detecting the internal temperature of the press chamber 31 necessary to control the sintering process for integrating the bearing structure with the fabric combination.

Typically, controlling the sintering process for integrating the bearing structure with the fabric combination in the press 30 is performed by means of a controller 100. to this end, an electrical circuit and a data input/output circuit are provided together with the controller 100.

S80 represents completing the composite material bearing after high-temperature high-pressure sintering at S74, and S90 represents a bench test for the completed composite material bearing.

Figure 4:
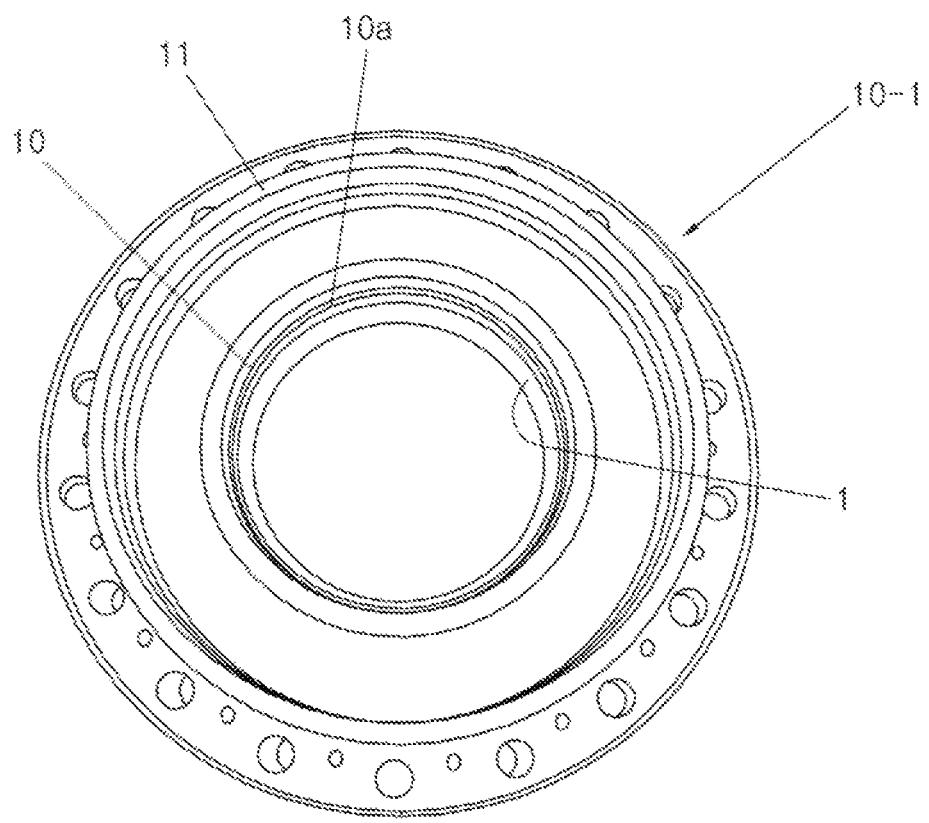
FIG. 4 illustrates a composite material bearing (a self-lubricating high performance bearing) completed according to the present invention.
Figure 5A:
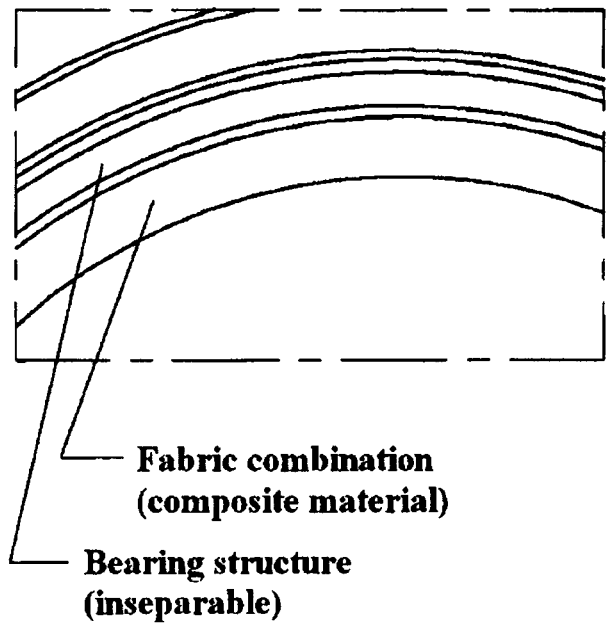
FIGS. 5A and 5B illustrate comparison of fusion surface property of the composite material bearing between an example according to the present invention and a comparative example.
Figure 5B:
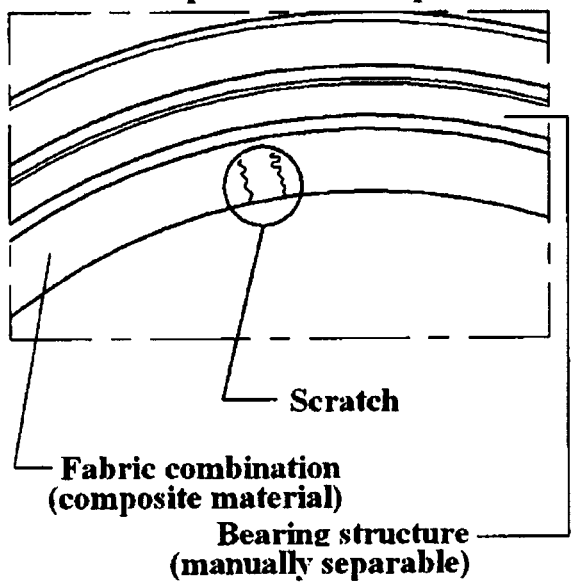

FIG. 4 illustrates the completed composite material bearing 10-1. The composite material bearing 10-1 includes a bearing structure 10, a fabric combination 1 integrated to the fusion surface 10a of the bearing structure 10, and an outer body 11 which forms the outer surface of the bearing structure 10. The composite material bearing 10-1 indicates a self-lubricating high performance bearing.

Superior performance of the composite material bearing 10-1 manufactured using the above method is illustrated through the following example and comparitive example.

EXAMPLE

As in the method of manufacturing the composite material bearing illustrated in FIG. 1, the fusion surface 10a of a bearing structure 10 which is a steel structure to which a composite material bearing 10-1 is fused was subjected to sanding, grease removing, and oxidation and salt treatment. Taking into consideration a final composite material bearing 10-1, a fan-shaped pattern was designed and cut, thus making a fabric combination 1. This fabric combination 1 was composed of a PTFE (Teflon)-based film having a thickness of 0.1~0.2 mm, a glass-based fabric having a thickness of 0.1~0.2 mm and a quarts-based fabric having a thickness of 0.3~0.4 mm.

Subsequently, the fabric combination 1 was fixed to the fusion surface 10a which is the steel surface of the bearing structure 10, assembled with a jig 20, mounted into a press 30, and integrally molded under conditions of a pressure of 30~100 kgf/cm$^2$, a temperature of 300~400° C. and 3 hr, thereby manufacturing the composite material bearing 10-1.

COMPARATIVE EXAMPLE

The fusion surface 10a of a bearing structure 10 which is a steel structure to which a composite material bearing 10-1 is fused was subjected to sanding, grease removing, and oxidation and salt treatment. Subsequently, the surface of an integrated glass-PTFE tape was treated with a Na-based etching solution. Thereafter, the etched surface was treated with acetone, dried, and coated with art epoxy adhesive so as to be adhered to the surface of the structure, thereby manufacturing a composite material bearing 10-1.

TEST EXAMPLE

The properties of the composite material bearings of the example and comparative example were measured. The results are shown in Table 1 below.

As is apparent from Table 1, the composite material bearing component of the example according to the present invention did not generate fracture of the adhesion surface even at an accumulated angle of 3000 deg and continuously maintained a friction coefficient of 0.02 or less. However, the comparative composite material bearing generated fracture of the friction surface at an accumulated angle of 500 deg and the adhesion surface was already separated at 100 deg.

|  | Example | Comp. Example |
|---|---|---|
| Test conditions | 2000 psi pressure 5~10° driving Accumulated angle 3000 deg | 2000 psi pressure 5~10° driving Accumulated angle 3000 deg |
| Friction coeffi. | Static friction coeff. 0.02 Kinetic friction coeff. 0.01 | Static friction coeff. 0.2 Kinetic friction coeff. 0.15 |
| Fracture of adhesion surface (accumulated angle) | No fracture | 800 deg |
| Friction surface after test | No mark for stress concentration | Scratch by stress concentration |
| Properties of fusion surface | Inseparable | Manually separable |

Thus, the example according to the present invention is more effective at manufacturing the composite material bearing able to operate for a long period of time at sudden high loads. Because the fusion material of the example according to the present invention is based on PTFE, chemical fracture due to temperature and humidity is considerably decreased compared to when using a typical organic (epoxy, PEEK) adhesive.

The method of manufacturing the composite material bearing component according to the present invention includes designing the pattern of the fabric combination 1 comprising the PTFE film 3, the quartz fabric 5, and the glass fabric 7 which are stacked, in consideration of the final shape of the bearing, and stacking the fabric combination of the fusion surface 10a which is the steel surface of the bearing structure 10 of the composite material bearing 10-1; and simultaneously molding and fusing under conditions of a thermal treatment temperature of 300~400° C. and a pressure of 30~100 kgf/cm$^2$, thereby manufacturing the composite material bearing 10-1. Such a composite material bearing 10-1 functions, as a self-lubricating high performance bearing, thus satisfying high performance requirements of the driving friction surface of a B&S nozzle which is a thrust vector control nozzle and also satisfying a high load and low friction coefficient requited of guided weapon components.

As described hereinbefore, the present invention provides a method of manufacturing a composite material bearing component. According to the present invention, the composite material is manufactured in the form of a self-lubricating high performance bearing through fusion after integral molding of a PTFE resin and quarts/glass fabrics, thereby satisfying high performance requirements of the driving friction surface of a B&S nozzle which is a thrust vector control nozzle.

Also, according to the present invention, the composite material comprises a PTFE resin and quartz/glass fabrics, which are integrally molded, thus ensuring a bearing pressure of 40 kg/mm$^2$ or more and a friction coefficient of 0.02 or less, consequently making it easy to apply to guided weapon components requiring a high load and low friction coefficient.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a composite material bearing, comprising:
    forming a fabric combination by combining a PTFE-based film, a quartz-based fabric and a glass-based fabric;
    cutting the fabric combination;
    treating a fusion surface of a bearing structure;
    stacking the fabric combination onto the treated fusion surface of the bearing structure, thus forming a composite material bearing assembly;
    coupling the composite material bearing assembly with a jig;
    mounting the composite material bearing assembly with the jig into a chamber;
    insulating the chamber; and
    sintering the composite material bearing assembly mounted in the chamber by heating and pressing.

2. The method of claim 1, wherein the fabric combination is cut into a fan-shape.

3. The method of claim 1, wherein the fusion surface of the bearing structure is subjected to sanding, grease removing, oxidation and salt treatment.

4. The method of claim 1, wherein the jig has a spherical surface corresponding to the composite material bearing assembly and is fixed to the composite material bearing assembly by pressing.

5. The method of claim 1, wherein the composite material bearing assembly positioned in the chamber is insulated in such a manner that an outer surface of the composite material bearing assembly is covered with an organic or inorganic fabric.

6. The method of claim 1, wherein the sintering is performed by heating the chamber to a temperature range about 300° C. to 400° C.

7. The method of claim 1, wherein the sintering is performed by pressuring the chamber to a pressure range about 30 kgf/cm$^2$ to 100 kgf/cm$^2$.

* * * * *